United States Patent
Ossipov

(10) Patent No.: US 9,930,013 B2
(45) Date of Patent: Mar. 27, 2018

(54) CONTROL OF OUT-OF-BAND MULTIPATH CONNECTIONS

(71) Applicant: Cisco Technology, Inc., San Jose, CA (US)

(72) Inventor: Andrew E. Ossipov, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/541,445

(22) Filed: Nov. 14, 2014

(65) Prior Publication Data

US 2016/0142373 A1 May 19, 2016

(51) Int. Cl.
*H04L 29/06* (2006.01)

(52) U.S. Cl.
CPC ........ *H04L 63/029* (2013.01); *H04L 63/0236* (2013.01); *H04L 63/061* (2013.01); *H04L 63/0807* (2013.01); *H04L 63/0876* (2013.01); *H04L 63/126* (2013.01); *H04L 63/166* (2013.01); *H04L 69/16* (2013.01); *H04L 69/161* (2013.01); *H04L 69/163* (2013.01); *H04L 63/1408* (2013.01)

(58) Field of Classification Search
CPC . H04L 63/02; H04L 63/0209; H04L 63/0281; H04L 63/029; H04L 63/08; H04L 63/0807; H04L 63/123; H04L 63/126; H04L 63/16; H04L 63/166; H04L 69/16; H04L 69/161; H04L 69/163
See application file for complete search history.

(56) References Cited

U.S. PATENT DOCUMENTS

| | | | | |
|---|---|---|---|---|
| 7,188,365 | B2 * | 3/2007 | Balissat | H04L 63/0209 726/15 |
| 8,014,290 | B2 * | 9/2011 | Ji | H04L 45/00 370/227 |
| 8,090,874 | B2 * | 1/2012 | Panasyuk | G06F 21/31 709/219 |
| 8,214,635 | B2 | 7/2012 | Wang et al. | |
| 8,504,822 | B2 | 8/2013 | Wang et al. | |
| 9,166,959 | B2 * | 10/2015 | Chhabra | H04L 9/16 |

(Continued)

FOREIGN PATENT DOCUMENTS

WO 2013147911 A1 10/2013

OTHER PUBLICATIONS

Bagnulo, "Secure MPTCP," Internet Engineering Task Force (IETF), Network Working Group, Standards Track, Internet-Draft, Feb. 12, 2014, 8 pages.

(Continued)

*Primary Examiner* — Zachary A. Davis
(74) *Attorney, Agent, or Firm* — Edell, Shapiro & Finnan, LLC

(57) ABSTRACT

An intermediate device (such as a firewall) is disposed between first and second devices (such as a client and a server device, respectively). Communications between the first and second devices are intercepted in both directions by the intermediate device, which spoofs the receiving device by modifying messages sent by the transmitting device. The modified message uses a key held by the intermediate device instead of a key belonging to the sending device.

24 Claims, 12 Drawing Sheets

(56) References Cited

U.S. PATENT DOCUMENTS

2010/0070770 A1* 3/2010 Flores ................ H04L 9/3242
                                                      713/176
2011/0013553 A1   1/2011 Patel et al.
2012/0144062 A1   6/2012 Livet et al.
2012/0243441 A1   9/2012 Reunamaki et al.
2013/0312054 A1  11/2013 Wang et al.
2014/0082204 A1   3/2014 Shankar et al.
2014/0169330 A1   6/2014 Rommer et al.

OTHER PUBLICATIONS

Bagnulo, "Threat Analysis for TCP Extensions for Multipath Operation with Multiple Addresses," Internet Task Force (IETF), Informational, Request for Comments: 6181, Mar. 2011, 17 pages.
Ford, et al., "TCP Extensions for Multipath Operation with Multiple Addresses," Internet Engineering Task Force (IETF), Experimental, Request for Comments: 6824, Jan. 2013, 64 pages.
International Search Report and Written Opinion in counterpart International Application No. PCT/US2015/060252, dated Feb. 8, 2016, 9 pages.

* cited by examiner

CONTROL OF OUT-OF-BAND MULTIPATH CONNECTIONS

TECHNICAL FIELD

The present disclosure relates to computer network security measures.

BACKGROUND

Traditional network applications may leverage a single path for every unique connection. As multiple redundant paths between application clients and servers become more common in private networks as well as on the Internet, modern state-of-the-art protocol implementations attempt to take advantage of these multiple paths to improve throughput, reduce latency, and increase connection resiliency. One example of such a protocol is the Multipath Transmission Control Protocol (MPTCP). This protocol allows two endpoints to exchange data for a single connection across multiple subflows which can use different paths and network interfaces. This use case is especially relevant with laptops and mobile phones, which natively support multiple network attachment points (e.g., Ethernet, Wi-Fi®, and cellular endpoints). An application can pass data for a single connection across any of these interfaces, thus achieving lower latency, managing bandwidth costs, and improving resiliency when the physical client moves between different networks. When underlying MPTCP subflows re-establish, the application layer connection remains up at all times.

As MPTCP is being defined, one commonly overlooked area is its integration into existing enterprise/corporate security models. Since a single MPTCP flow may carry data across multiple different subflows and network paths, deep inspection and threat prevention devices (such as next-generation firewalls or next-generation intrusion prevention systems) can no longer effectively enforce the corporate security policies.

DESCRIPTION OF EXAMPLE EMBODIMENTS

Overview

Described herein are systems and methods for controlling multipath connections. An intermediate network device (such as a firewall) is disposed between first and second devices (such as client and server devices, respectively). Communications between the first and second devices are intercepted in both directions by the intermediate device, which spoofs the receiving device by modifying messages sent by the transmitting device. The modified message uses a key held by the intermediate device instead of a key belonging to the sending device.

Example Embodiments

Figure 1:
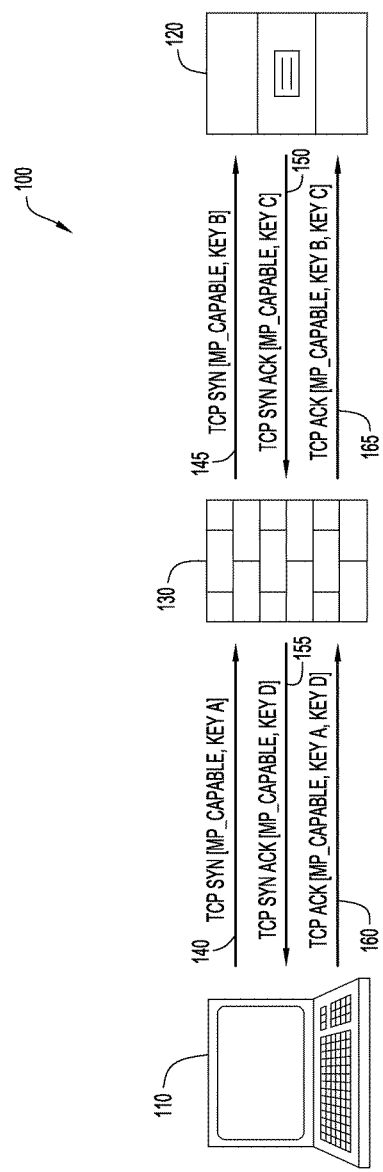
FIG. 1 illustrates operation of a system described herein, in accordance with an example embodiment.

The system 100 described herein is illustrated generally in FIG. 1, according to an embodiment. Two computing devices, 110 and 120, are attempting to communicate over an MPTCP system. The first device 110 may implement a client and the second device 120 may implement a server, for example. An intermediate device 130, e.g. a firewall or other network security device or appliance, is also present in the network, such that communications between device 110 and 120 pass through the intermediate device 130. The intermediate device 130 may be an edge security device that is configured to operate on the "edge" or perimeter of a corporate/enterprise network. The intermediate device 130, if so located, may be positioned to implement a security boundary that controls the flow of information into and/or out of the corporate/enterprise network. Moreover, while the discussion herein refers to a single intermediate device or firewall, it is to be understood that in some networks, multiple firewalls may be used in a clustered configuration. In this case, two or more firewalls may be used to mediate the interactions of devices 110 and 120. In such an embodiment, one or more load balancers may be used to manage the workloads of the individual firewalls.

Normally, a communication from device 110 and destined for device 120 may include a key associated with device 110. In this example, this key is shown as key A. In various situations, the key itself will be sent; in other situations, a function of the key is sent, such as a token or hash value based on the key. Similarly, a communication from device 120 and destined for device 110 will normally include a key associated with device 120, shown here as key B. Again, in some situations a function of this key will be sent. Such keys, and/or functions thereof, are typically exchanged regardless of the routed path in a multipath system.

Intermediate device 130 effectively intercepts communications in both directions, and spoofs the receiving device. Device 130 replaces a received key with an alternate key, and forwards the communication to the receiving device. A similar operation occurs in the opposite direction, using another alternate key. In a configuration using clustered intermediate devices or firewalls, each alternate key is shared among the individual intermediate devices in the cluster.

In the illustrated example, device 110 sends a Transmission Control Protocol (TCP) synchronization (TCP SYN) message 140 addressed to device 120, where the message includes key A or a function thereof. Intermediate device 130 receives the message 140 and substitutes its own key B or a function thereof before forwarding the message on to device 120, as message 145. Device 120 then sends an acknowledgment message 150, TCP SYN ACK, that includes its key C or a function thereof. Again, intermediate device 130 receives this message 150 and substitutes another alternate key (key D in this example). Intermediate device 130 then forwards the TCP SYN ACK message to device 110 as message 155. A further acknowledgement message 160 (TCP ACK) may be sent from device 110 to device 120. The message 160 includes key A (originally associated with device 110) and key D (provided in the previous message from intermediate device 130), or a function of these keys. The intermediate device 130 intercedes and substitutes key C (originally associated with device 120) and alternate key B, or a function of these keys, forming message 165. This latter message is then sent to device 120.

As a result, device 120 will now expect future communications from device 110 to include key B or a function thereof, where this key was provided by the intermediate device 130. Device 110 will now expect future communications from device 120 to include key D or a function thereof, where key D was provided by intermediate device 130. Keys B and D or functions thereof are provided uniquely by intermediate device 130 to devices 120 and 110, respectively. If device 120 now receives a communication from device 110 that does not include key B or a function thereof, i.e., a communication that did not arrive via intermediate device 130, then the message may be rejected. This forces communications from device 110 to device 120 to pass through intermediate device 130; communications that do not pass via intermediate device 130 will not be accepted at device 120, because the expected key is absent.

The device 110 stores key D as if it were the key of the second device 120 even though this key was generated by the intermediate device 130. Similarly, the second device 120 uses key B as if it were the key of the first device 110. The security device 130 uses key A as the key of the first device 110 when sending MPTCP segments to the first device 110 and uses key C as the key of the second device 120 when sending MPTCP segments to the second device 120.

The intermediate device 130 may be a network security appliance, such as a firewall, and may perform various security related operations on received traffic, such as packet inspection and filtering. In such an arrangement, only communications that have passed through intermediate device 130, i.e., communications that have been subjected to security processing, will reach device 120. In this way, the routing of communications from device 110 to device 120 is controlled and necessarily subjected to security processing. An analogous result is achieved for communications sent from device 120 to device 110. The intermediate device 130 may be configured to operate on the perimeter or edge of a network to be protected.

Figure 2:
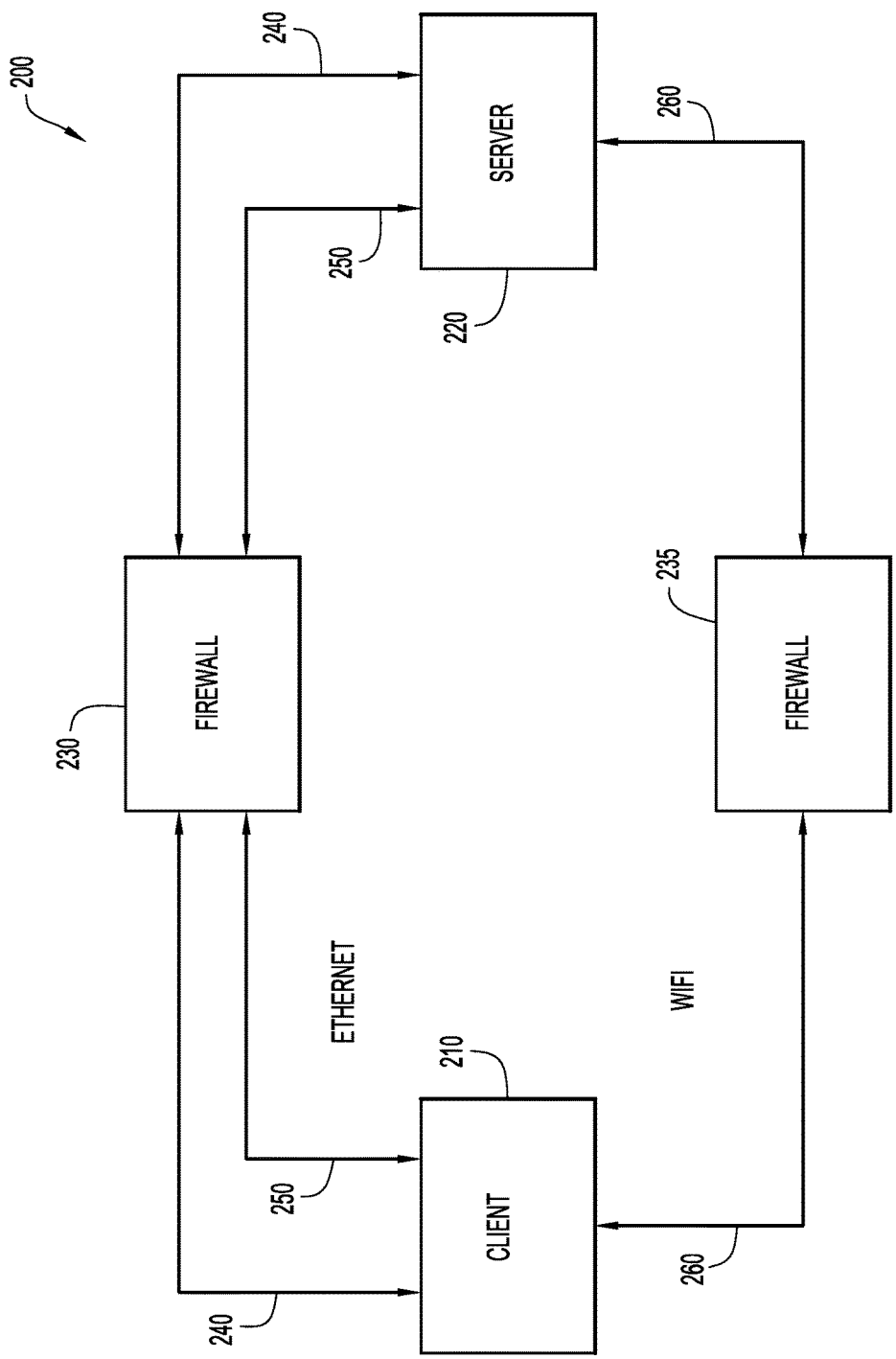
FIG. 2 is a block diagram illustrating operation of the system in a multipath environment, in accordance with an example embodiment.

These results are further illustrated in FIG. 2. Here, a client 210 is in communication with a server 220. The illustrated system is a multipath system, so that an Ethernet connection is available in addition to a Wi-Fi connection. Because of the processing described above, the routing of Ethernet communications 240 and 250 is controlled and forced to pass through firewall 230. A first subflow 240 is established through an Ethernet interface. Firewall 230 substitutes a first alternate key in place of a key of the client 210 before passing the client's message to server 220. The firewall 230 also substitutes a second alternate key in place of the key of server 220 before passing the server's message to the client 210.

A second subflow 250 is then established through the Ethernet interface. Here, firewall 230 intercepts a message sent by client 210 and addressed to server 220. The firewall 230 replaces a token in that message, where the original token had been based on the client's key. The firewall 230 replaces the token with a different token, one that is based on the first alternate key instead of the client's key. This communication, thus modified, is then forwarded to server 220. A message traveling in the opposite direction is handled in an analogous fashion by server 220. The latter message includes a token originally based on the server's key. The firewall 230 replaces the token in this message with a different token, one that is based on the second alternate key. The firewall 230 then sends this modified communication to the client 210.

The client 210 may attempt to establish a third subflow 260 through a different interface. In the illustrated example, a Wi-Fi interface is used for this third subflow. A different firewall may be used here, firewall 235. This firewall 235 has no knowledge of the alternate keys used by firewall 230. When the server 220 receives a communication from client 210, the server 220 expects to see a token that is based on the first alternate key, given previous subflows 240 and 250 in which the first alternate key was presented to server 220. Because flow 260 passes through a different firewall 235, the first alternate key is not presented to server 220; when the server 220 does not see the first alternate key, the subflow 260 is denied. In this way, only subflows passing through the first firewall 230 are accepted. As a result, the routing of subsequent subflows between client 210 and server 220 is controlled, so that they must pass through firewall 230.

As noted above, in some networks multiple firewalls may be used in a clustered configuration. In such a case, instead of the single firewall 230, two or more clustered firewalls may be used to mediate the communications of client 210 and server 220. In such an embodiment, one or more load balancers may be used to manage the workloads of the individual firewalls. The individual firewalls in the cluster would share the alternate keys. Likewise, firewall 235 may instead be a cluster of firewalls.

Figure 3:
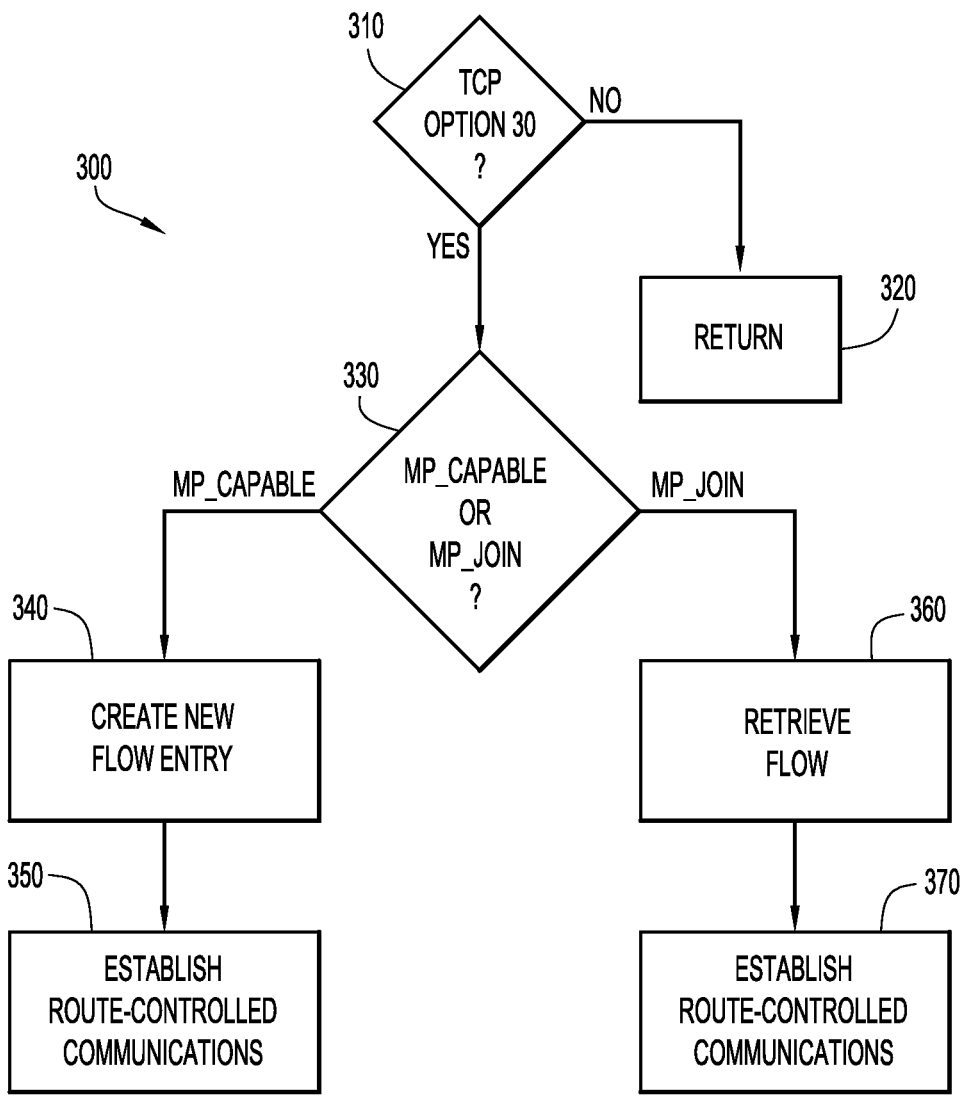
FIG. 3 is a flowchart illustrating operation of the system described herein, in accordance with an example embodiment.

Reference is now made to FIGS. 3-11 which collectively depict operations performed at the intermediate device in accordance with various embodiments of the techniques presented herein. FIG. 3 is a flowchart that depicts high-level processing 300 at the intermediate. As noted above, the intermediate device may be a firewall or other device with security related functionality, and the intermediate device may be configured to operate at the edge of a corporate/enterprise network. The illustrated embodiment is described in the context of the MPTCP protocol, though the process described herein may also be applicable for other multipath protocols. At 310, a determination is made in the illustrated embodiment as to whether TCP option 30 is in use. Option 30 serves to specify a multipath protocol in the context of MPTCP. It is to be understood that in alternative embodiments, the use of a multipath protocol may be specified using another option identifier, or through another mechanism. If TCP option 30 is in use, the process continues at 330, otherwise, at 320, the process returns and operations 300 ends. At 330, a determination is made as to whether the MP_CAPABLE option is present or whether the MP_JOIN option is present. The former means that a new flow entry is to be created; the latter means that an existing flow is already in existence. In the case of the MP_CAPABLE option, at 340 a new communication flow is created. In an embodiment, one or more policies may be consulted to ensure that this new flow is permissible. At 350, route-controlled communications are established, where such communications are controlled by the processing of an intermediate device as will be described in greater detail below. In the event of the MP_JOIN option, the appropriate flow is retrieved at 360. At 370, route-controlled communications are instituted between a pair of computing devices, as will be described further below.

Figure 4:
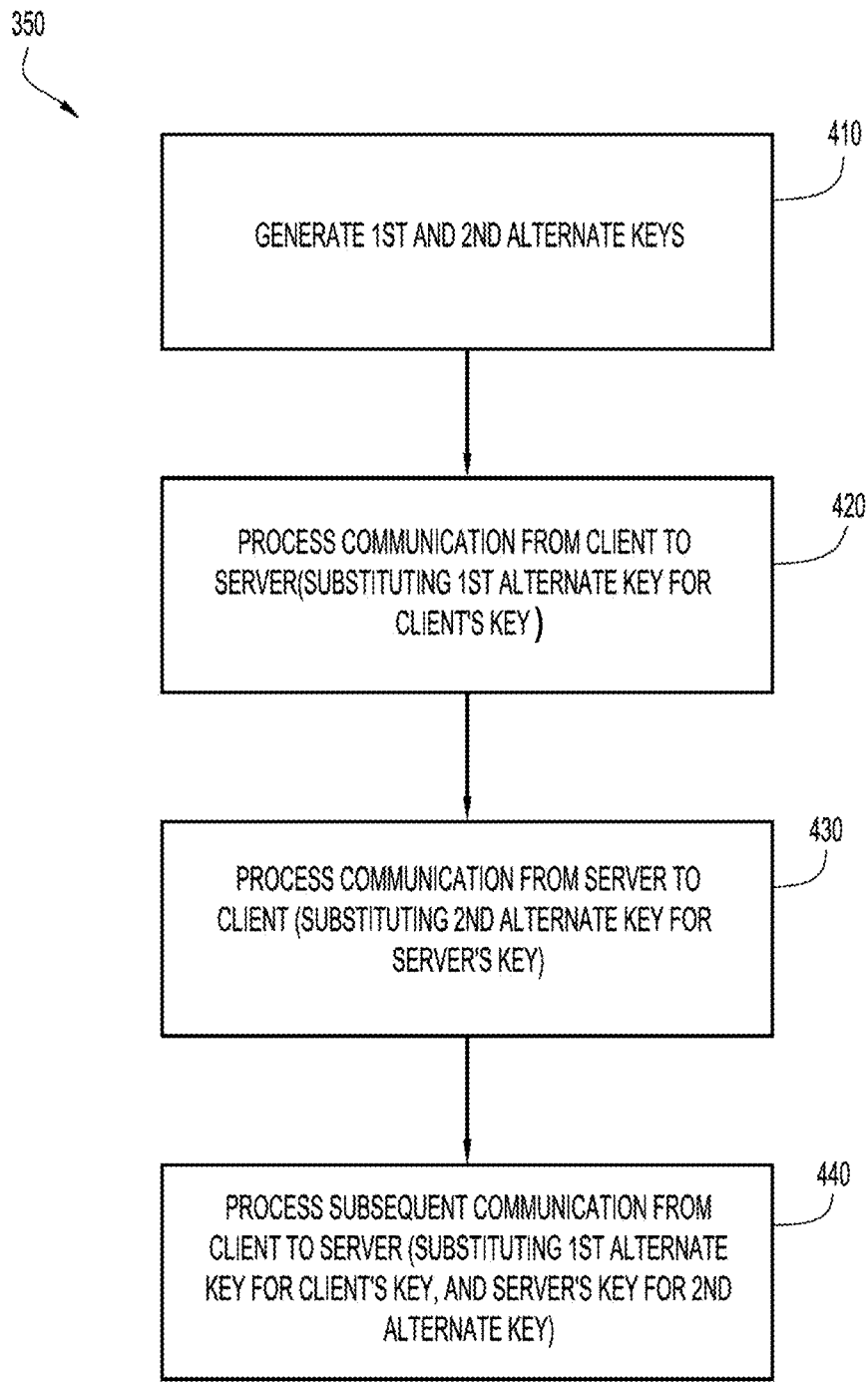
FIG. 4 is a flowchart illustrating establishment of route-controlled communications, in accordance with an example embodiment.

The establishment of route-controlled communications in the event of the MP_CAPABLE option (350 of FIG. 3) is illustrated in FIG. 4, according to an embodiment. At 410, the intermediate device generates a pair of alternate keys. In an alternative embodiment, the alternate keys may be retrieved from secure storage or obtained by the intermediate device from an external source through a secure mechanism. If generated locally, the alternate keys may represent the output of a random or pseudorandom source. The generation mechanism may be deterministic or non-deterministic. At 420, a communication from a first device to a second device (a client and server respectively in this example) is processed by the intermediate device. At 430, communication from the server to the client is processed by the intermediate device.

In an embodiment, an additional step 440 may take place, wherein the first device sends a TCP acknowledgement (TCP ACK), containing the key of the first device and the second alternate key. The intermediate device will then replace the key of the first device (e.g., of the client), substituting the first alternate key in its place. The intermediate device will also replace the second alternate key, substituting the key of the second device (e.g., of the server) in place of the second alternate key.

Figure 5:
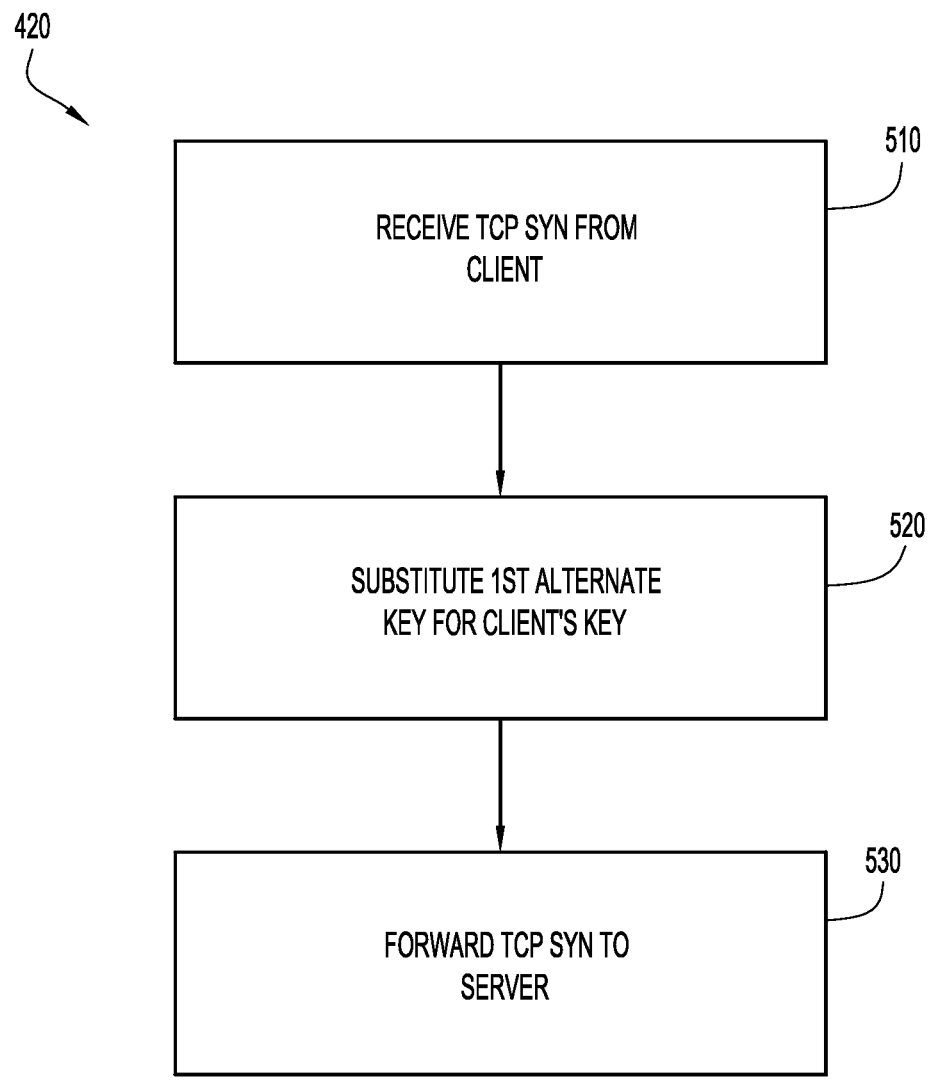
FIG. 5 is a flowchart illustrating processing a communication from a client to a server, in accordance with an example embodiment.

The processing of a communication from the client to the server (420 of FIG. 4) is illustrated in greater detail in FIG. 5. At 510, an initial synchronization message TCP SYN is received. This communication contains a key associated with the client. At 520, the key is replaced by the first alternate key, thereby modifying the communication. At 530, the modified TCP SYN message is forwarded to the server.

Figure 6:
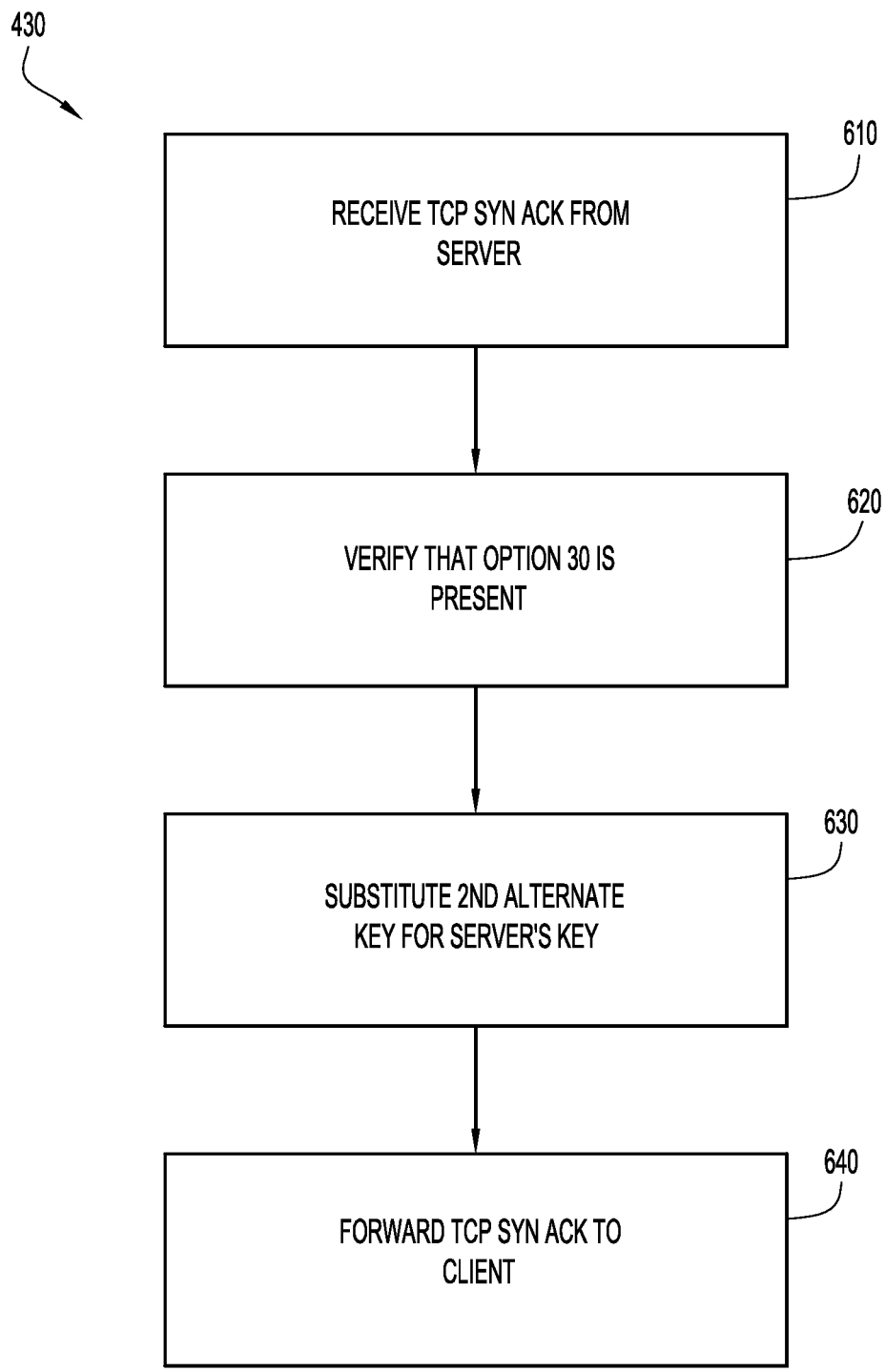
FIG. 6 is a flowchart illustrating processing a communication from a server to a client, in accordance with an example embodiment.
Figure 7:
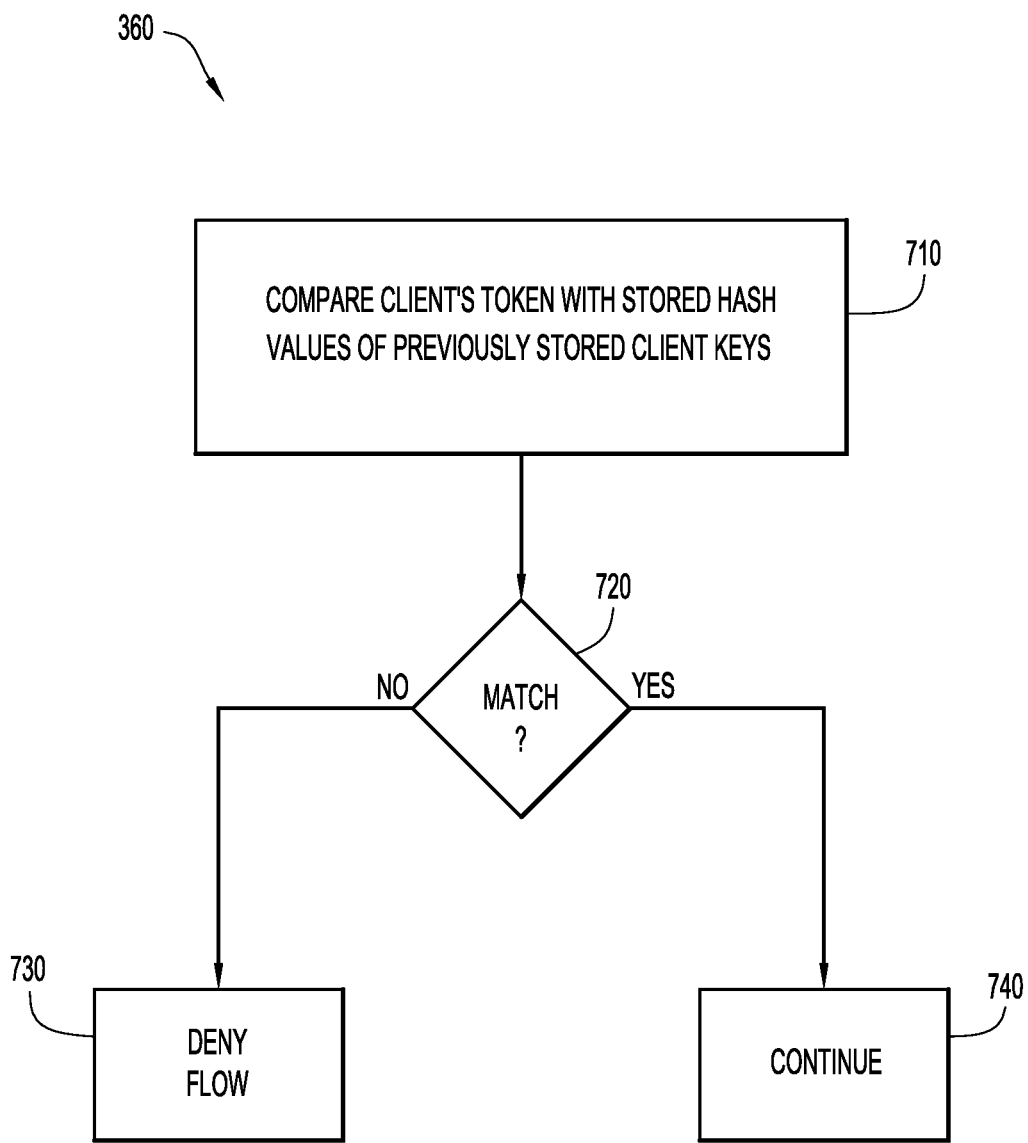
FIG. 7 is a flowchart illustrating a portion of a security protocol in a flow retrieval operation, in accordance with an example embodiment.

The processing of a communication from the server to the client (430 of FIG. 4) is illustrated in greater detail in FIG. 6. At 610, a synchronization acknowledgment message TCP SYN ACK is received. This communication contains a key associated with the server. At 620, a further verification of option 30 may be performed. At 630, the key is replaced by the second alternate key, thus modifying the communication. At 640, the modified TCP SYN ACK message is forwarded to the client. In an embodiment, the connection can now be inspected statefully using configured inspection rules. This can include virtual reassembly of segments at both the MPTCP level and the subflow level. Reassembly at the subflow level may be done using TCP sequencing. Reassembly at the MPTCP level may take advantage of the Data Sequence Signal (DSS) option to track a subflow sequence. The retrieval of a flow in the event of the MP_JOIN case is illustrated in FIG. 7, according to an embodiment. At 710, a comparison is made between a token received in the communication received from the client and stored hash values based on respective client keys that were previously stored. A match implies that the present communication is part of an existing flow. If a match is found at 720, the process may continue at 740; if a mismatch is found, the subflow may be denied at 730, or otherwise handled in accordance with a security policy. At 740, the subflow is allowed to continue and the process ends.

Figure 8:
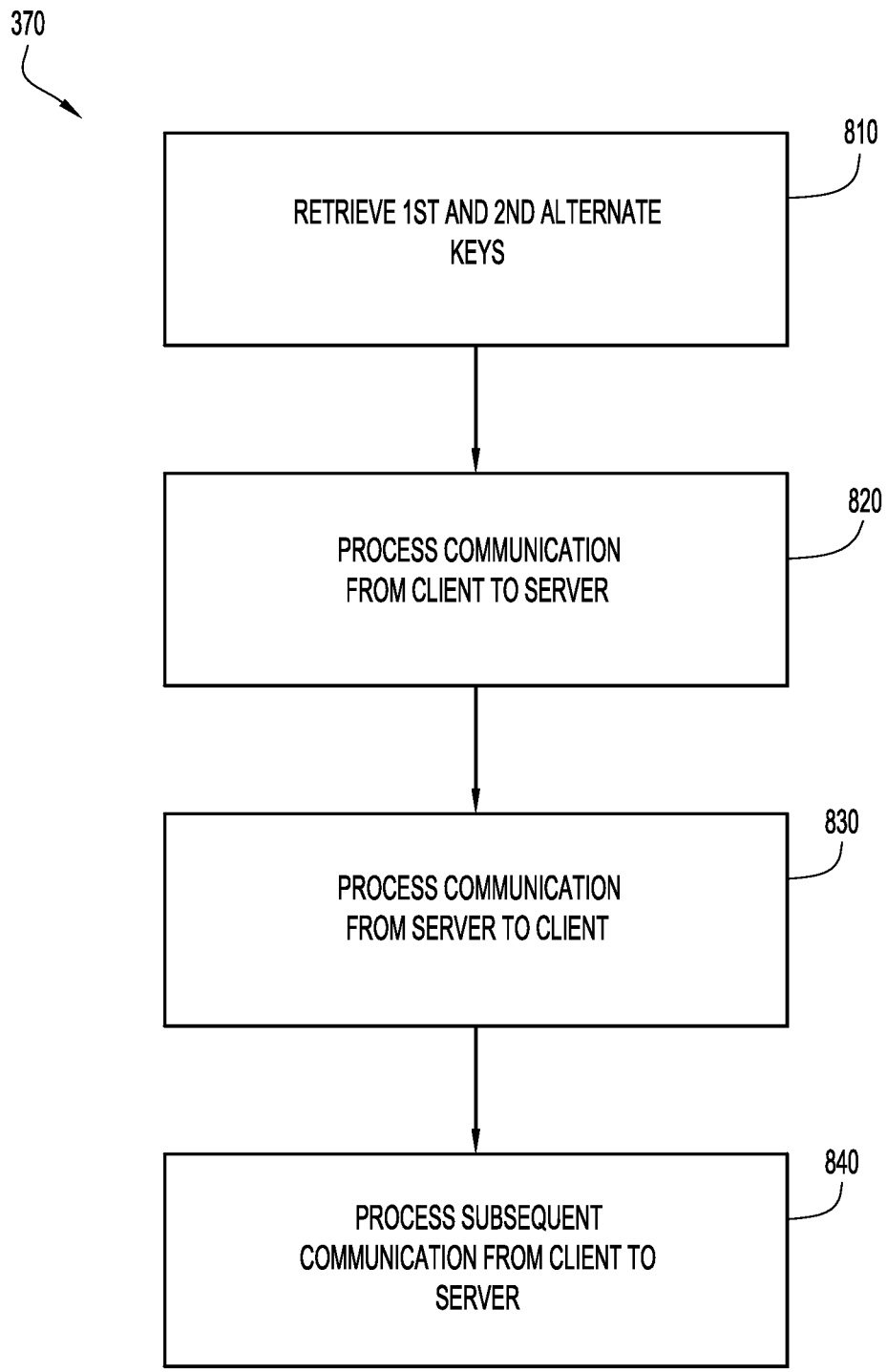
FIG. 8 is a flowchart illustrating establishment of route-controlled communications, in an alternative context, in accordance with an example embodiment.
Figure 9:
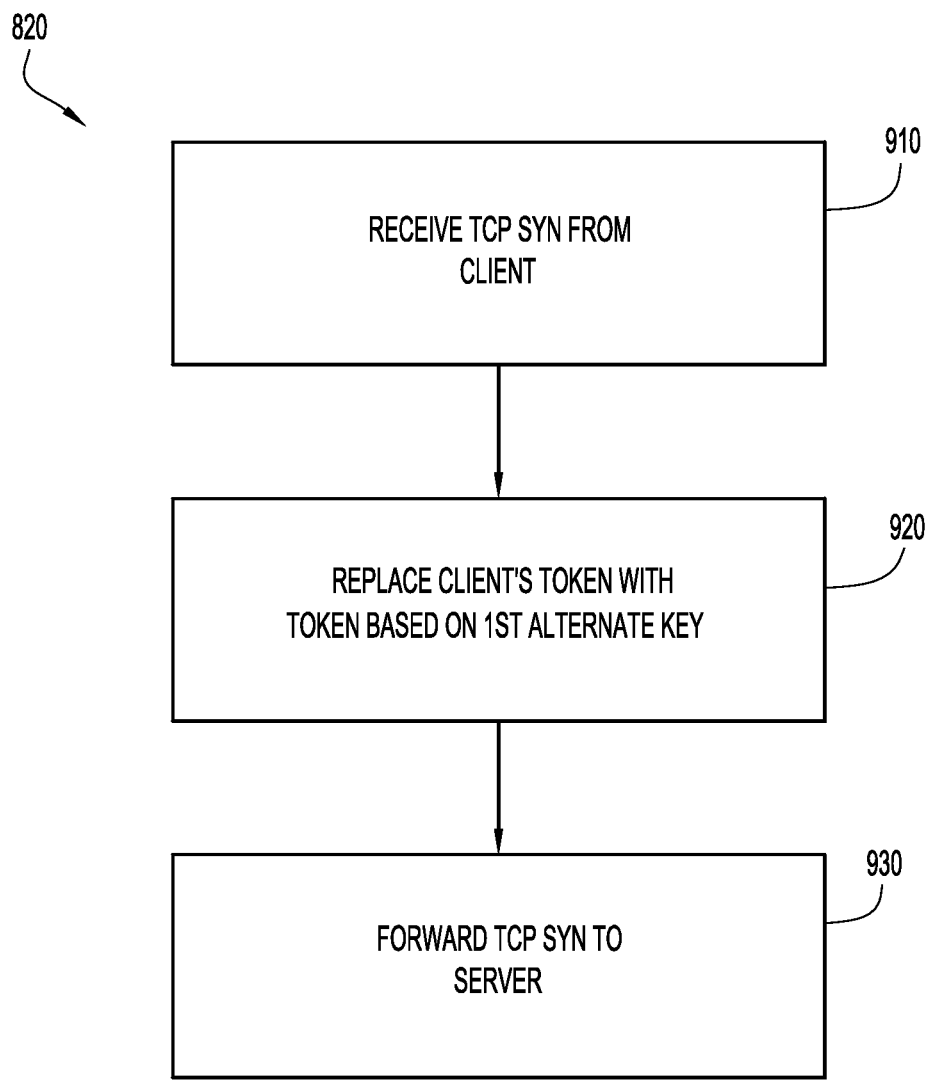
FIG. 9 is a flowchart illustrating the processing of a communication from a client to a server, in an alternative context, in accordance with an example embodiment.

The establishment of route-controlled communications in the MP_JOIN case (370 of FIG. 3) is illustrated in greater detail in FIG. 8 according to an embodiment. At 810, first and second alternate keys are retrieved at the intermediate device. The alternate keys may be obtained by the intermediate device from secure local storage or from an external source through a secure mechanism in alternative embodiments. At 820, communication from the client to the server is processed by the intermediate device. At 830, communication in the opposite direction, from the server to the client, is processed. In the event that there is further communication from the client to the server (e.g., subsequent acknowledgment), this is processed at 840.

The processes 820, 830, and 840 all entail use of the alternate keys. The processing of communication from client to server is illustrated in greater detail in FIG. 9. At 910, an initial message is received from the client at the intermediate device. In the context of MPTCP, this is a synchronization message, TCP SYN, and will indicate TCP Option 30 when the multipath protocol is being used. This communication includes a token based on the key associated with the client. In this sense, the token may be viewed as a function of this key. At 920, the intermediate device replaces this token with another, based on the first alternate key. If an address identifier is included in the TCP SYN message from the client, the intermediate device may also verify that this address resides on a reachable network. The TCP SYN message, now modified, is forwarded by the intermediate device to the server at 930.

Figure 10:
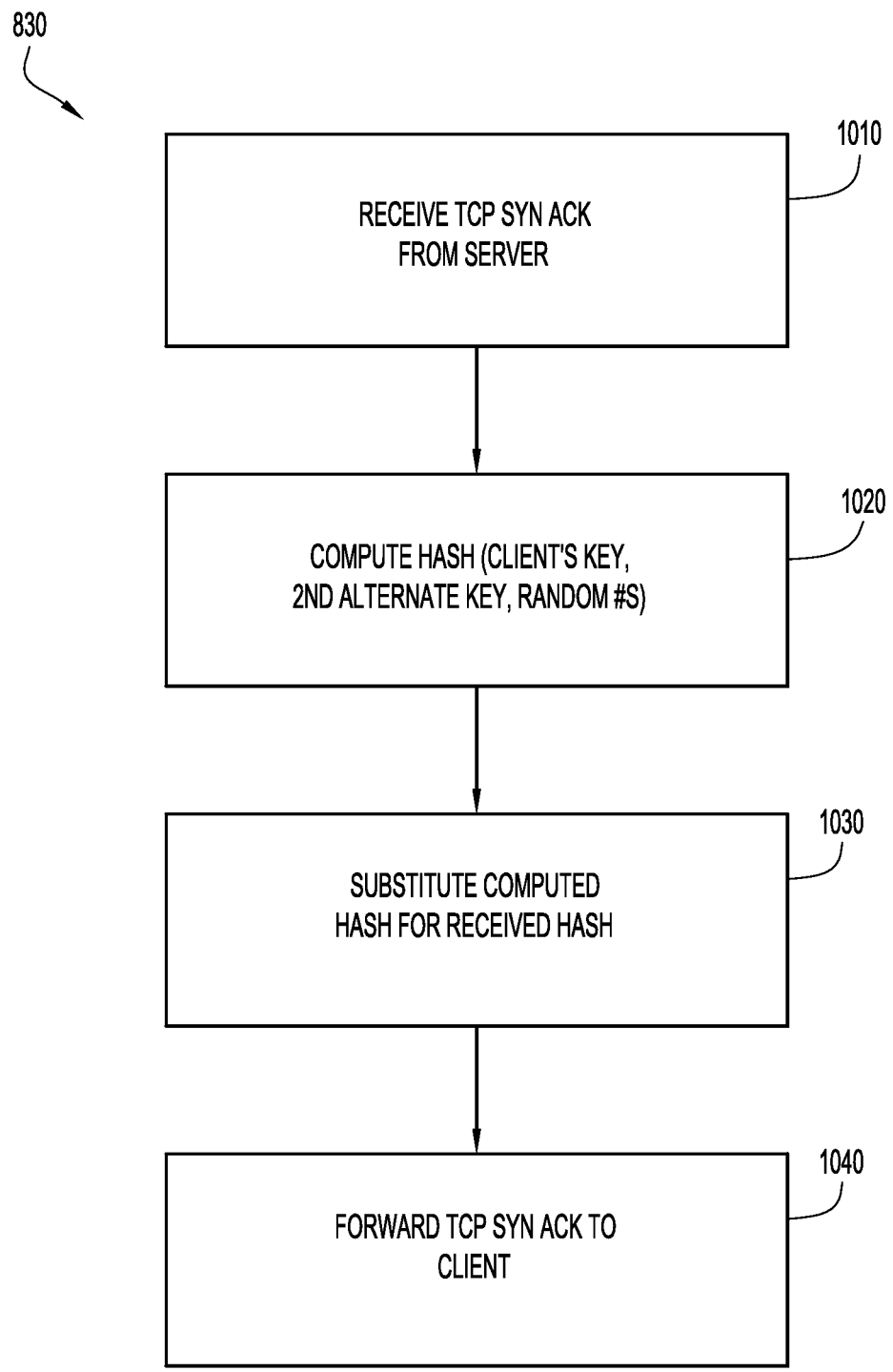
FIG. 10 is a flowchart illustrating the processing of a communication from a server to a client, in an alternative context, in accordance with an example embodiment.

Processing of a communication from the server to the client (e.g., TCP SYN ACK) is shown in FIG. 10, according to an embodiment. At 1010, the TCP SYN ACK is received at the intermediate device. This message includes a hash value based on the first alternate key and the server's key, as well as random values. In an embodiment, the random values include a value derived from previously communicated TCP SYN and another generated by the second device. At 1020, a different hash value is calculated by the intermediate device, based on the client's key (e.g., key A) and the second alternate key (e.g., key D), along with random values derived from previous communications. This latter hash value is substituted for the previous hash value at 1030. In an embodiment, the hash is a hash-based message authentication code (HMAC). At 1040, the now-modified TCP SYN ACK message is forwarded to the client.

Figure 11:
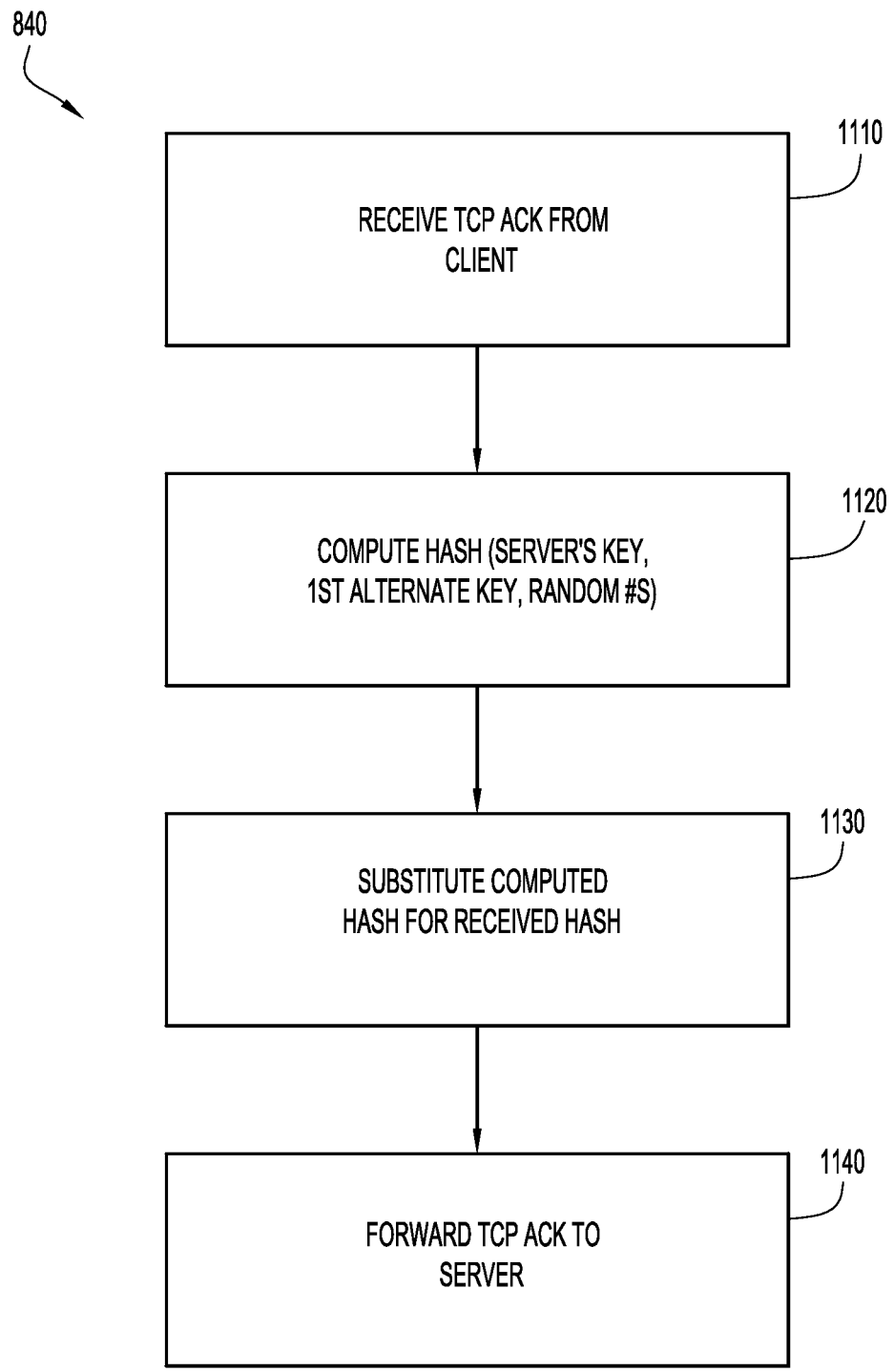
FIG. 11 is a flowchart illustrating the processing of subsequent communication from a client to a server, in an alternative context, in accordance with an example embodiment.

Processing of a subsequent communication from the client is illustrated in FIG. 11, according to an embodiment. In this example, the communication is an acknowledgment, TCP ACK. At 1110 the message is received at the intermediate device. At 1120, an additional hash is calculated based on the key associated with the server (e.g., key C), the first alternate key (e.g., key B), and random values derived from previous communications. At 1130, this additional hash value is substituted in place of the hash value in the received TCP ACK message, thereby modifying the TCP ACK message. The modified message is forwarded to the server at 1140. In an embodiment, the intermediate device may then inspect the connection. In an embodiment, the connection can now be inspected statefully using configured inspection rules. This can include virtual reassembly of segments at both the MPTCP level and the subflow level. Reassembly at the subflow level may be done using TCP sequencing. Reassembly at the MPTCP level may take advantage of the DSS option to track a subflow sequence.

Figure 12:
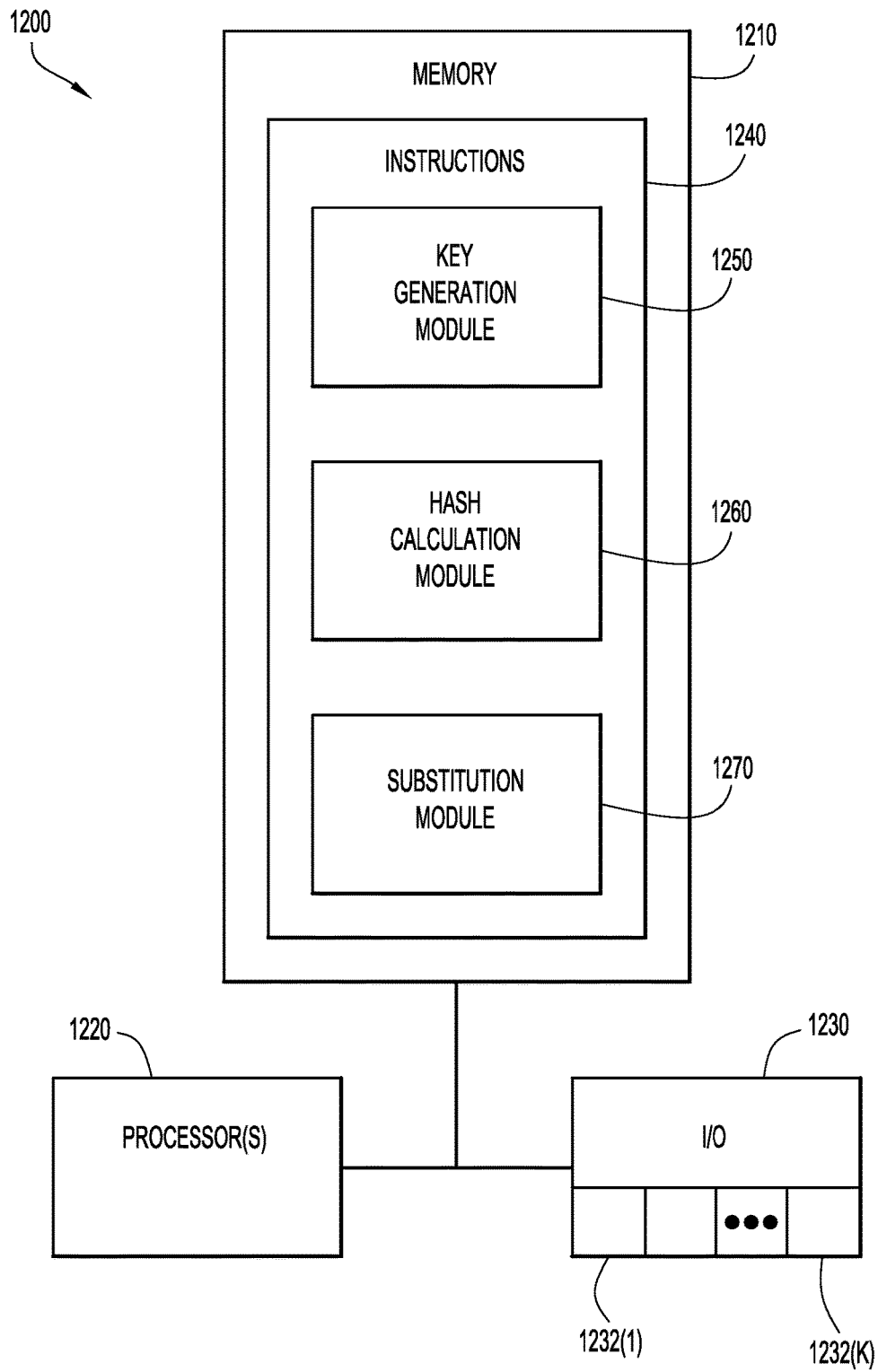
FIG. 12 is a block diagram illustrating a software or firmware embodiment of a device in accordance with an example embodiment.

In an embodiment, the above processing by the intermediate device is performed in accordance with software or firmware (or a combination thereof) executing on one or more processors. A software or firmware embodiment is illustrated in FIG. 12. Computing system 1200 includes one or more memory devices, shown collectively as memory 1210. Memory 1210 is in communication with one or more processors 1220 and with a network processor unit 1230 that has associated network ports 1232(1)-1232(K). The network processor unit 1230 and ports 1232(1)-1232(K) enable communication with a first and second computing device, e.g., a client and server. The network processor unit 1230 may include one or more Application Specific Integrated Circuits (ASICs) that are configured with digital logic gates to perform various networking and security functions (routing, forwarding, deep packet inspection, etc.)

Memory 1210 may comprise read only memory (ROM), random access memory (RAM), magnetic disk storage media devices, optical storage media devices, flash memory devices, electrical, optical, or other physically tangible (i.e., non-transitory) memory storage devices. Memory 1210 stores data as well as executable instructions 1240. Instructions 1240 are executable on processor(s) 1220. The processor(s) 1220 comprise, for example, a microprocessor or microcontroller that executes instructions 1240. Thus, in general, the memory 1210 may comprise one or more tangible (non-transitory) computer readable storage media (e.g., memory device(s)) encoded with software or firmware that comprises computer executable instructions. When the instructions are executed (by the processor(s) 1220) the software or firmware is operable to perform the operations described herein.

In the illustrated embodiment, the executable instructions 1240 may include several modules. These include a key generation module 1250, responsible for the processing related to the generation of alternate keys. A hash calculation module 1260 may also be present, where this module is responsible for hashing inputs (e.g., keys and random values) to generate hash values. Instructions 1240 may also include a substitution module 1270, responsible for replacing keys or functions of keys (such as hashes or tokens) in messages between clients and servers.

In summary, the techniques presented herein allow a perimeter security device to manipulate MPTCP options in such a way that all of the subflows for a particular MPTCP connection have to traverse the same security device or a cluster of devices. The security device can reassemble application traffic for full payload inspection without the security risk resulting from spreading a single MPTCP connection across multiple independent network exit points in order to evade deep inspection. These embodiments fully support MPTCP connections between compatible endpoints, but ensure that every MPTCP subflow always crosses the same perimeter security device or a cluster of such devices. The operation of the security device is completely transparent to the end application, since any out-of-band connections will be reset by the responder itself due to the token mismatch.

In one form, presented herein is a method comprising, at an intermediate device disposed in a network between the first computing device and a second computing device, receiving a first communication from the first device; modifying the first communication by substituting a first alternate key in place of the key of the first device; and forwarding the modified first communication to the second device.

In another form, an apparatus for an intermediate device for controlling multipath connections, is provided comprising: a memory; and a processor coupled to the memory device and configured to execute instructions stored in the memory device, wherein the processor: receives a first communication from a first device, modifies the first communication by substituting a first alternate key in place of the key of the first device, and forwards the modified first communication to a second device.

In another form, one or more computer readable non-transitory storage media are provided, encoded with computer-readable instructions that, when executed by a processor, cause the processor to: receive a first communication from a first device; modify the first communication by substituting a first alternate key in place of the key of the first device; and forward the modified first communication to a second device.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method comprising:
   at an intermediate device disposed in a network between a first device and a second device:
   receiving a first communication from the first device, wherein the first communication includes a key associated with the first device;
   determining whether the first communication is a multipath communication flow between the first device and the second device; and
   if the first communication is a multipath communication flow, modifying the first communication, to obtain a modified first communication, by replacing the key associated with the first device with a first key generated by the intermediate device, and forwarding the modified first communication to the second device, wherein the first key is different from the key associated with the first device.

2. The method of claim 1, further comprising:
   receiving a second communication from the second device, wherein the second device generates the second communication in response to receiving the first communication, and the second communication includes a key associated with the second device;
   modifying the second communication by replacing the key associated with the second device with a second key generated by the intermediate device, wherein the second key is different from the key associated with the second device; and
   forwarding the modified second communication to the first device.

3. The method of claim 2, wherein the intermediate device generates the first key in response to receiving a Transmission Control Protocol synchronization (TCP SYN) message from the first device, and generates the second key in response to receiving a TCP SYN acknowledgment (TCP SYN ACK) message from the second device, the method further comprising:
  receiving a third communication from the first device, the third communication comprising a Transmission Control Protocol acknowledgment (TCP ACK) and including the key associated with the first device and the second key;
  modifying the third communication by replacing the key associated with the first device with the first key generated by the intermediate device, and by replacing the second key generated by the intermediate device with the key associated with the second device; and
  forwarding the modified third communication to the second device.

4. The method of claim 2, wherein the modifying of the first communication comprises replacing a token based on the key associated with the first device with a token based on the first key generated by the intermediate device.

5. The method of claim 4, wherein modifying the second communication comprises:
  computing a substitute hash value based on the key associated with the first device, the second key generated by the intermediate device, and one or more random numbers derived from the first communication and second communication; and
  substituting the substitute hash value in place of a hash value generated by the second device in the second communication.

6. The method of claim 4, further comprising:
  receiving a third communication from the first device;
  computing an additional substitute hash value, based on the key associated with the second device, the first key generated by the intermediate device, and one or more random numbers derived from the first communication and second communication; and
  modifying the third communication by substituting the additional substitute hash value in place of a hash value generated by the first device in the third communication.

7. The method of claim 6, wherein:
  the first communication is a Transmission Control Protocol synchronization (TCP SYN) message,
  the second communication is a TCP SYN acknowledgment (TCP SYN ACK) message, and
  the third communication is a TCP acknowledgement (TCP ACK) message.

8. The method of claim 1, wherein the first communication includes a multipath protocol identifier indicating whether the first communication is a subflow associated with an existing communication between the first device and the second device, and the method further comprises:
  comparing a token associated with the first device with one or more stored hash values that are based on one or more previously stored keys of the first device if the multipath protocol identifier indicates that the first communication is a subflow of an existing communication between the first device and the second device; and
  if the comparing results in a mismatch, processing further communications between the first device and the second device in accordance with a security policy.

9. An apparatus comprising:
  a plurality of network ports that send and receive communications to and from one or more networks;
  a network processor unit coupled to the network ports; and
  a processor coupled to the network processor unit, wherein the processor is configured to:
    receive a first communication from a first device, wherein the first communication includes a key associated with the first device;
    determine whether the first communication is a multipath communication flow between the first device and a second device; and
    if the first communication is a multipath communication flow, modify the first communication, to obtain a modified first communication, by replacing the key associated with the first device with a first key generated by an intermediate device disposed between the first device and second device, and forward the modified first communication to the second device, wherein the first key is different from the key associated with the first device.

10. The apparatus of claim 9, wherein the processor is further configured to:
  receive a second communication from the second device, wherein the second device generates the second communication in response to receiving the first communication, and the second communication includes a key associated with the second device;
  modify the second communication by replacing the key associated with the second device with a second key generated by the intermediate device, wherein the second key is different from the key associated with the second device; and
  forward the modified second communication to the first device.

11. The apparatus of claim 10, wherein the intermediate device generates the first key in response to receiving a Transmission Control Protocol synchronization (TCP SYN) message from the first device, and generates the second key in response to receiving a TCP SYN acknowledgment (TCP SYN ACK) message from the second device, and wherein the processor is further configured to:
  receive a third communication from the first device, the third communication comprising a Transmission Control Protocol acknowledgment (TCP ACK) and including the key associated with the first device and the second key;
  modify the third communication by replacing the key associated with the first device with the first key generated by the intermediate device, and by replacing the second key generated by the intermediate device with the key associated with the second device; and
  forward the modified third communication to the second device.

12. The apparatus of claim 10, wherein the processor is further configured to modify the first communication by replacing a token based on the key associated with the first device with a token based on the first key generated by the intermediate device.

13. The apparatus of claim 12, wherein the processor is further configured to modify the second communication by:
  computing a substitute hash value based on the key associated with the first device, the second key generated by the intermediate device, and one or more random numbers derived from the first communication and second communication; and
  substituting the substitute hash value in place of a hash value generated by the second device in the second communication.

14. The apparatus of claim 12, wherein the processor is further configured to:

receive a third communication from the first device;
compute an additional substitute hash value, based on the key associated with the second device, the first key generated by the intermediate device, and one or more random numbers derived from the first communication and second communication; and
modify the third communication by substituting the additional substitute hash value in place of a hash value generated by the first device in the third communication.

15. The apparatus of claim 14, wherein:
the first communication is a Transmission Control Protocol synchronization (TCP SYN) message,
the second communication is a TCP SYN acknowledgment (TCP SYN ACK) message, and
the third communication is a TCP acknowledgement (TCP ACK) message.

16. The apparatus of claim 9, wherein the first communication includes a multipath protocol identifier indicating whether the first communication is a subflow associated with an existing communication between the first device and the second device, and the processor is further configured to:
compare a token associated with the first device with one or more stored hash values that are based on one or more previously stored keys of the first device if the multipath protocol identifier indicates that the first communication is a subflow of an existing communication between the first device and the second device; and
if the comparing results in a mismatch, process further communications between the first device and the second device in accordance with a security policy.

17. One or more computer readable non-transitory storage media encoded with computer-readable instructions that, when executed by a processor, cause the processor to:
receive a first communication from a first device, wherein the first communication includes a key associated with the first device;
determine whether the first communication is a multipath communication flow between the first device and a second device; and
if the first communication is a multipath communication flow, modify the first communication, to obtain a modified first communication, by replacing the key associated with the first device with a first key generated by an intermediate device disposed between the first device and second device, and forward the modified first communication to the second device, wherein the first key is different from the key associated with the first device.

18. The computer readable storage media of claim 17, wherein the instructions further cause the processor to:
receive a second communication from the second device, wherein the second device generates the second communication in response to receiving the first communication, and the second communication includes a key associated with the second device;
modify the second communication by replacing the key associated with the second device with a second key generated by the intermediate device, wherein the second key is different from the key associated with the second device; and
forward the modified second communication to the first device.

19. The computer readable storage media of claim 18, wherein the intermediate device generates the first key in response to receiving a Transmission Control Protocol synchronization (TCP SYN) message from the first device, and generates the second key in response to receiving a TCP SYN acknowledgment (TCP SYN ACK) message from the second device, and wherein the instructions further cause the processor to:
receive a third communication from the first device, the third communication comprising a Transmission Control Protocol acknowledgment (TCP ACK) and including the key associated with the first device and the second key;
modify the third communication by replacing the key associated with the first device with the first key generated by the intermediate device, and by replacing the second key generated by the intermediate device with the key associated with the second device; and
forward the modified third communication to the second device.

20. The computer readable storage media of claim 18, wherein the instructions that cause the processor to modify the first communication cause the processor to replace a token based on the key associated with the first device with a token based on the first key generated by the intermediate device.

21. The computer readable storage media of claim 20, wherein the instructions that cause the processor to modify the second communication cause the processor to:
compute a substitute hash value based on the key associated with the first device, the second key generated by the intermediate device, and one or more random numbers derived from the first communication and second communication; and
substitute the substitute hash value in place of a hash value generated by the second device in the second communication.

22. The computer readable storage media of claim 20, wherein the instructions further cause the processor to:
receive a third communication from the first device;
compute an additional substitute hash value, based on the key associated with the second device, the first key generated by the intermediate device, and one or more random numbers derived from the first communication and second communication; and
modify the third communication by substituting the additional substitute hash value in place of a hash value generated by the first device in the third communication.

23. The computer readable storage media of claim 22, wherein:
the first communication is a Transmission Control Protocol synchronization (TCP SYN) message,
the second communication is a TCP SYN acknowledgment (TCP SYN ACK) message, and
the third communication is a TCP acknowledgement (TCP ACK) message.

24. The computer readable storage media of claim 17, wherein the first communication includes a multipath protocol identifier indicating whether the first communication is a subflow associated with an existing communication between the first device and the second device, and wherein the instructions further cause the processor to:
compare a token associated with the first device with one or more stored hash values that are based on one or more previously stored keys of the first device if the multipath protocol identifier indicates that the first communication is a subflow of an existing communication between the first device and the second device; and if the comparing results in a mismatch, process further communications between the first device and the second device in accordance with a security policy.

* * * * *

UNITED STATES PATENT AND TRADEMARK OFFICE
CERTIFICATE OF CORRECTION

PATENT NO. : 9,930,013 B2
APPLICATION NO. : 14/541445
DATED : March 27, 2018
INVENTOR(S) : Andrew E. Ossipov et al.

Page 1 of 1

It is certified that error appears in the above-identified patent and that said Letters Patent is hereby corrected as shown below:

In the Claims

Claim 9, Column 9, Line 66, please replace "coupled to the network ports;" with --coupled to the plurality of network ports;--

Signed and Sealed this
Twenty-ninth Day of January, 2019

Andrei Iancu
*Director of the United States Patent and Trademark Office*